3,210,349
METHYLATION OF PRIMARY AND SECONDARY AMINES USING A SMALL STOICHIOMETRIC EXCESS OF FORMALDEHYDE AND ADDING A SMALL STOICHIOMETRIC EXCESS OF FORMIC ACID LAST
Norman B. Godfrey, Austin, Tex., assignor to Jefferson Chemical Company, Inc., Houston, Tex., a corporation of Delaware
No Drawing. Filed Nov. 6, 1961, Ser. No. 150,153
7 Claims. (Cl. 260—247)

This invention relates to the method for the preparation of tertiary amines. More particularly, this invention relates to a method for the methylation of a primary or a secondary amine.

One of the methods that is widely used for the methylation of primary or secondary amines is the Eschweiler-Clarke modification of the Leuckart reaction ("Organic Reactions," volume V, page 307), wherein the amine to be methylated is mixed with a 100% to 300% molar excess of formic acid to provide a corresponding formate salt, followed by a reaction of the formate salt with formaldehyde for a period of eight to twelve hours. Prior workers have considered it necessary, and it has been the customary practice, to utilize the procedure just outlined in methylating amines, even though very large excesses of reactants are required.

It has now been surprisingly discovered that by violating the above teaching of the prior art, a much more effective process for the methylation of amines is possible. Briefly, and in accordance with the present invention, a primary or secondary amine is mixed with a small stoichiometric excess of formaldehyde and thereafter, a small stoichiometric excess of formic acid (based on the amine) is slowly added to the resultant mixture with agitation at a temperature in the range of 50° C. to 110° C., whereby a completely methylated amine is formed.

The starting materials for the present invention include formic acid, formaldehyde and a primary or secondary amine.

Preferably, the formic acid is employed as a concentrated 85% to 95% aqueous solution. Formaldehyde may be employed in aqueous solution (e.g., formalin), as paraformaldehyde, etc.

The amines to be utilized, in accordance with the present invention, are primary or secondary amines of the general formula:

wherein R is a saturated hydrocarbon group and R¹ is hydrogen or a saturated hydrocarbon group. The hydrocarbon group may be alkyl or aralkyl and may be substituted with alkoxy or tertiary amine groups. Preferably, the amine will contain from 2 to 20 carbon atoms. Also, R and R¹, taken together, may represent a carbocyclic or saturated heterocyclic ring. Examples of suitable amines include methylamine, dimethylamine, and homologs thereof, such as n-hexylamine, di-n-propylamine, etc., morpholine, etc., 2-aminoethanol, 2,2′-iminodiethanol, 2-(2-aminoethoxy)ethanol, 4-(2-aminoethyl) morpholine.

In accordance with the present invention, from about 1 to about 1.2 (perferably 1.1) mols of formaldehyde per equivalent of replaceable amino hydrogen (1 equivalent per mol of secondary amine, 2 equivalents per mol of primary amine) are mixed with the amine to be methylated as a first step. External cooling may be applied during this step if desired in order to moderate the exothermal heat of reaction. As a second step, from about 1 to about 1.2 (preferably about 1.1) mols of formic acid per equivalent of replaceable amino hydrogen are added slowly with agitation. Reaction occurs exothermally at temperatures in the neighborhood of 50 to 60° C., accompanied by vigorous evolution of carbon dioxide gas. Toward the end of the formic acid addition, the rate normally slackens; and external heating may be resumed. When gas evolution stops, the tertiary amine reaction product may be recovered by any suitable means, such as distillation. Optionally, a strong base such as sodium or potassium hydroxide may first be added to the crude reaction product mixture in order to neutralize any unreacted formic acid and to cause separation into an aqueous phase and an organic phase containing essentially all the tertiary amine product.

The invention will be further illustrated by the following examples, which are given by way of illustration and not as limitation on the scope of this invention.

Example I

Morpholine (86 grams) and 36.3% formaldehyde solution (91 grams) were mixed in a stirred reaction flask. Formic acid (56 grams, 85% strength) was added dropwise to the spontaneously refluxing mixture, which was then heated under reflux until gas evolution ceased. Total reaction time was two hours. Sodium hydroxide (25 grams) was dissolved in the reaction mixture, which was then distilled. The distillate, collected over the range of 88° to 99° C., contained N-methylmorpholine in 92.5% yield, together with co-distilling water.

Example II

Dipropylamine (202 grams) was mixed with 37.8% formaldehyde solution (175 grams) as above. Formic acid (56 grams, 85%) was added dropwise during one hour. The mixture was refluxed for another 1½ hours, until gas evolution had nearly ceased. Potassium hydroxide (50 grams) was dissolved in the reaction mixture, which separated into two layers. The upper layer was dried with solid potassium hydroxide and distilled, giving a 67% yield of methyldipropylamine boiling in the range 114.5° to 115° C.

Example III

Paraformaldehyde (50 grams) was added to pyrrolidine (102.7 grams) with stirring and cooling in an ice bath. Formic acid (86.2 grams, 85%) was added dropwise to 50° to 60° C. during 1½ hours. The mixture was refluxed another two hours. Sodium hydroxide (20 grams) was dissolved in the reaction mixture, the layers were separated, and the upper layer was distilled. An 82% yield of N-methylpyrrolidine was obtained, boiling at 73.5° to 74.5° C.

Example IV

Hexylamine (102.4 grams) and formaldehyde solution (178.5 grams, 37.8%) were mixed as above, then treated dropwise with formic acid (119 grams, 85%). Addition required 3½ hours, and refluxing, another hour. The yield of N,N-dimethylhexylamine (boiling point 148° C.) was 65%.

Example V

Formic acid (119.4 grams, 85%) was added to a mixture of 4-(2-aminoethyl)morpholine (130.1 grams) and formaldehyde (178.7 grams, 37.8%) in one hour at 75° to 90° C. The reaction was completed by heating at reflux temperature for 2½ hours. The yield of 4-(2-dimethylaminoethyl)morpholine (boiling range 56.5° to 57° C./2 mm.) was 61%.

What is claimed is:
1. In a method for the methylation of an amine selected from the group consisting of primary and sec- ondary amines by treating said amine with formic acid and formaldehyde, the improvement which comprises mixing said amine with a small stoichiometric excess of formaldehyde, adding a small stoichiometric excess of formic acid to the resultant mixture with agitation, at a temperature within the range of about 50° to about 110° C., whereby a methylation reaction is spontaneously initiated which results in the evolution of carbon dioxide and maintaining said reaction mixture at said reaction temperature until the evolution of carbon dioxide substantially ceases.

2. A method as in claim 1 wherein from about 1 to about 1.2 mols of formaldehyde and from about 1 to about 1.2 mols of formic acid are employed per replaceable amino hydrogen in the amine feed stock.

3. A method as in claim 2 wherein the amine is morpholine and the product is N-methylmorpholine.

4. A method as in claim 2 wherein the amine feed stock is dipropylamine and the product is methyl-dipropylamine.

5. A method as in claim 2 wherein the amine feed stock is pyrrolidine and the product is N-methylpyrrolidine.

6. A method as in claim 2 wherein the amine feed stock is hexylamine and the product is N,N-dimethylhexylamine.

7. A method as in claim 2 wherein the amine feed stock is 4-(2-aminoethyl)morpholine and the product is 4-(2-dimethylaminoethyl)morpholine.

References Cited by the Examiner
UNITED STATES PATENTS

| 2,366,534 | 1/45 | Kirby | 260—583 |
| 2,776,314 | 1/57 | Erickson | 260—583 |

OTHER REFERENCES

Clarke et al.: J. Am. Chem. Soc., vol. 55, pp. 4571–87 (1933).

References Cited by the Applicant
UNITED STATES PATENTS 2,636,032   4/53   Weston et al.

NICHOLAS S. RIZZO, *Primary Examiner.*

LEON ZITVER, *Examiner.*